(12) United States Patent
Ikeda

(10) Patent No.: US 9,395,251 B2
(45) Date of Patent: Jul. 19, 2016

(54) TEMPERATURE SENSITIVE BODY, OPTICAL TEMPERATURE SENSOR, TEMPERATURE MEASUREMENT DEVICE, AND HEAT FLUX MEASUREMENT

(75) Inventor: Yuji Ikeda, Kobe (JP)

(73) Assignee: IMAGINEERING, INC., Kyogo (JP)

( * ) Notice: Subject to any disclaimer, the term of this patent is extended or adjusted under 35 U.S.C. 154(b) by 6 days.

(21) Appl. No.: 13/499,081

(22) PCT Filed: Sep. 30, 2010

(86) PCT No.: PCT/JP2010/067186
§ 371 (c)(1),
(2), (4) Date: Jun. 12, 2012

(87) PCT Pub. No.: WO2011/040588
PCT Pub. Date: Apr. 7, 2011

(65) Prior Publication Data
US 2012/0250724 A1  Oct. 4, 2012

(30) Foreign Application Priority Data

Sep. 30, 2009 (JP) ................................. 2009-229089

(51) Int. Cl.
*G01K 11/00* (2006.01)
*G01K 11/32* (2006.01)
*G01K 17/00* (2006.01)

(52) U.S. Cl.
CPC ............ *G01K 11/3213* (2013.01); *G01K 17/00* (2013.01)

(58) Field of Classification Search
USPC ................ 374/161, 10, 30, E11.018
See application file for complete search history.

(56) References Cited

U.S. PATENT DOCUMENTS

| | | | |
|---|---|---|---|
| 4,671,651 A | 6/1987 | Toyoda et al. | |
| 4,778,987 A * | 10/1988 | Saaski et al. | 250/226 |
| 4,906,107 A * | 3/1990 | Luukkala | 374/161 |
| 5,110,216 A * | 5/1992 | Wickersheim et al. | 374/122 |
| 5,302,025 A * | 4/1994 | Kleinerman | 374/131 |
| 5,560,712 A * | 10/1996 | Kleinerman | 374/161 |
| 6,937,884 B1 * | 8/2005 | Barbour | 600/473 |

(Continued)

FOREIGN PATENT DOCUMENTS

| | | |
|---|---|---|
| JP | 56-77739 U | 6/1981 |
| JP | 56-111437 A | 9/1981 |

(Continued)

OTHER PUBLICATIONS

International Search Report of PCT/JP2010/067186, mailing date of Nov. 16, 2010.

*Primary Examiner* — Lisa Caputo
*Assistant Examiner* — Nasir U Ahmed
(74) *Attorney, Agent, or Firm* — Westerman, Hattori, Daniels & Adrian, LLP

(57) ABSTRACT

A temperature sensitive body 102 used as a target of an optical temperature measurement, includes an inclusion 202 having an optical property related to an irradiated light varies with a change in temperature, and a light-transmissive outer shell member 200 enclosing the inclusion 202. When a temperature is measured, the inclusion 202 emits light when a light is radiated upon the inclusion 202. Since an optical property related to the irradiated light varies in accordance with a change in temperature, the temperature of the inclusion 202 can be detected by analyzing the outgoing light. A temperature of a location in which the temperature sensitive body is provided can be detected using the temperature of the inclusion 202.

1 Claim, 2 Drawing Sheets

(56) References Cited

U.S. PATENT DOCUMENTS

| | | | |
|---|---|---|---|
| 7,676,981 B2* | 3/2010 | Buckingham et al. | 42/132 |
| 7,770,463 B2* | 8/2010 | Sheverev et al. | 73/800 |
| 8,337,079 B2* | 12/2012 | Kinugasa et al. | 374/4 |
| 2001/0011480 A1* | 8/2001 | Reimer | 73/705 |
| 2003/0112443 A1* | 6/2003 | Hjelme et al. | 356/480 |
| 2003/0118075 A1* | 6/2003 | Schweiger et al. | 374/118 |
| 2004/0138850 A1* | 7/2004 | Nakakita et al. | 702/130 |
| 2006/0077311 A1* | 4/2006 | Renneberg | 349/5 |
| 2007/0114138 A1* | 5/2007 | Krasteva et al. | 205/787 |
| 2012/0038919 A1* | 2/2012 | Ikeda | 356/328 |
| 2013/0102066 A1* | 4/2013 | Bureau et al. | 435/288.7 |

FOREIGN PATENT DOCUMENTS

| | | | |
|---|---|---|---|
| JP | 57-52835 A | 3/1982 | |
| JP | 1-51933 B2 | 6/1984 | |
| JP | 61-122537 U | 8/1986 | |
| JP | 64-46733 U | 3/1989 | |
| JP | 3-156332 A | 7/1991 | |
| JP | 6-265415 A | 9/1994 | |
| JP | 2002-340698 A | 11/2002 | |
| JP | 2004-212193 A | 7/2004 | |
| JP | 2007-206023 A | 8/2007 | |
| JP | 2008138300 A * | 6/2008 | 374/161 |

\* cited by examiner

TEMPERATURE SENSITIVE BODY, OPTICAL TEMPERATURE SENSOR, TEMPERATURE MEASUREMENT DEVICE, AND HEAT FLUX MEASUREMENT

TECHNICAL FIELD

The present invention relates to a temperature sensitive body for measuring temperature, wherein the temperature sensitive body utilizes an optical property that varies with temperature, an optical temperature sensor, a temperature measurement device, and a heat flux measurement device using the temperature sensitive body.

BACKGROUND ART

Conventionally, as a method of measuring temperature and heat flux, an electrical method has been employed, in which a thermocouple and/or thermistor are attached at a measuring location. For example, Patent Document 1 discloses a temperature measurement device that measures temperature of an exhaust gas exhausted from a turbine main body. In this temperature measurement device, a tip of a thermocouple is fixed to a protection tube disposed inside a diffuser.

PATENT DOCUMENT

[Patent Document 1] Japanese Unexamined Patent Application, Publication No. 2007-206023

DISCLOSURE OF THE INVENTION

Problems to be solved by the Invention

However, in the conventional temperature measurement devices, it has been difficult to acquire a fast response time since the thermocouple has a response lag.

The present invention has been made in view of the above-mentioned fact, and it is an object of the present invention to realize a temperature measurement, which is excellent in response time by utilizing a substance whose optical property related to light incident thereon varies with a change in temperature.

Means for Solving the Problems

A first aspect of the present invention is a temperature sensitive body, comprising: an inclusion having an optical property related to light irradiated thereon, wherein the optical property varies with a change in temperature; and a light-transmissive outer shell member enclosing the inclusion, wherein the temperature sensitive body is used as a target of an optical temperature measurement.

In accordance with a first aspect of the present invention, an inclusion having an optical property related to an irradiated light enclosed in an outer shell member, wherein the optical property varies in accordance with a change in temperature. A temperature sensitive body is used as a target of an optical temperature measurement. When a temperature is measured, a light is radiated upon the inclusion. As a result, a light is emitted from the inclusion. Since an optical property related to the irradiated light changes in accordance with a change in temperature, the temperature of the inclusion is detected by analyzing the outgoing light. In this manner, according to the first aspect of the invention, the temperature is measured utilizing a material whose optical property related to the irradiated light varies in accordance with a change in temperature.

A second aspect of the present invention is a temperature sensitive body as set forth in claim 1, wherein the inclusion has a light transmissive characteristic, and the light transmissive characteristic related to light irradiated thereon varies with a change in temperature.

In accordance with a second aspect of the present invention, when a light is radiated on the inclusion, the light transmits through the inclusion. The inclusion is changeable in a transmission characteristic related to the irradiated light in accordance with a change in temperature. Therefore, for example, a temperature of the inclusion can be detected by analyzing, for example, the transmittance of the light.

A third aspect of the present invention is a temperature sensitive body, as set forth in claim 2, wherein the inclusion causes the irradiated light to be retroreflected.

In accordance with a third aspect of the present invention, the irradiated light is retroreflected by the inclusion.

A forth aspect of the present invention is a temperature sensitive body, as set forth in any one of claims 1 through 3, wherein the outer shell member is a hollow particle in the form of an approximately spherical shape.

In accordance with a fourth aspect of the present invention, since the outer shell member is a hollow particle in the form of an approximately spherical shape, the outer shell member and an inclusion enclosed therein are resistant to deformation.

A fifth aspect of the present invention is a n optical temperature sensor, comprising: a temperature sensitive body as set forth in any one of claims 1 through 4; an incoming light guide path, connected with the temperature sensitive body, wherein the incoming light guide path transmits light to be irradiated upon the inclusion of the temperature sensitive body; and an outgoing light guide path connected with the temperature sensitive body, wherein the outgoing light guide path transmits light emitted from the inclusion of the temperature sensitive body.

In accordance with a fifth aspect of the present invention, a light is radiated to the temperature sensitive body from an incoming light guide path, and a light returned from the temperature sensitive body is emitted from an outgoing light guide path.

A sixth aspect of the present invention is a temperature measurement device, comprising: an optical temperature sensor as set forth in claim 5; a light source that radiates a light toward an entrance of the incoming light guide path; and an optical analyzing device that receives an outgoing light from the outgoing light guide path, analyzes the outgoing light, and detects a temperature of the temperature sensitive body.

In accordance with a sixth aspect of the present invention, an optical analyzing device is provided that analyzes an outgoing light from the outgoing light guide path, and detects a temperature of the temperature sensitive body.

A seventh aspect of the present invention is a heat flux measurement device , comprising: an optical temperature sensor as set forth in claim 5; a light source that radiates a light toward an entrance of the incoming light guide path; and an optical analyzing device that receives an outgoing light from the outgoing light guide path, analyzes the outgoing light, detects an amount of change in temperature, and detects a heat flux of the temperature sensitive body based on the amount of change in temperature.

In accordance with a seventh aspect of the present invention, an optical analyzing device is provided that analyzes the outgoing light, detects an amount of change in temperature of the temperature sensitive body, and detects a heat flux of the temperature sensitive body based on the amount of change in temperature.

Effects of the Invention

According to the present invention, a temperature is measured utilizing a substance whose optical property related to an irradiated light varies in accordance with a change in temperature. Accordingly, a response lag such as a case of a thermocouple does not occur. Accordingly, it is possible to realize a temperature measurement, which is excellent in response time.

In the above-mentioned fourth aspect of the present invention, since the outer shell member is a hollow particle in the form of an approximately spherical shape, the outer shell member and the inclusion enclosed therein are resistant to deformation. Therefore, when a light transmits through the inclusion, a change in an optical path length is suppressed, and it is possible to enhance temperature measurement accuracy.

BEST MODE FOR CARRYING OUT THE INVENTION

In the following, a detailed description will be given of preferred embodiments of the present invention with reference to drawings. It should be noted that the following embodiments are mere examples that are essentially preferable, and are not intended to limit the scope of the present invention, applied field thereof, or application thereof.

Figure 1:
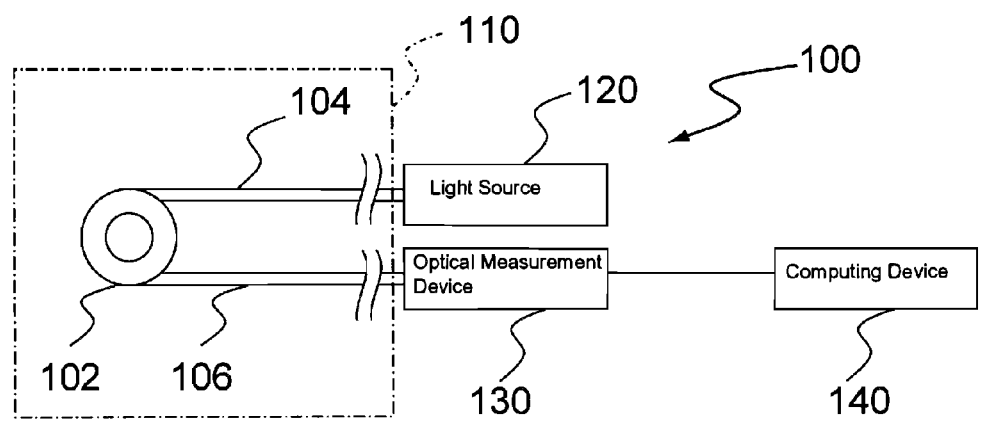
FIG. 1 is a schematic view illustrating a configuration of a temperature measurement device.

As shown in FIG. 1, a temperature measurement device 100 is provided with an optical temperature sensor 110, a light source 120, an optical measurement device 130, and a computing device 140. The optical temperature sensor 110 includes a temperature sensitive body 102 in the form of an approximately spherical shape, and first and second optical fibers 104 and 106 that extend from the temperature sensitive body 102. The light source 120 is connected to the first optical fiber 104 that extends from the optical temperature sensor 110. The optical measurement device 130 is connected to the second optical fiber 106 that extends from the optical temperature sensor 110. The computing device 140 is connected to the optical measurement device 130 and receives an output signal from the optical measurement device 130.

Figure 2:
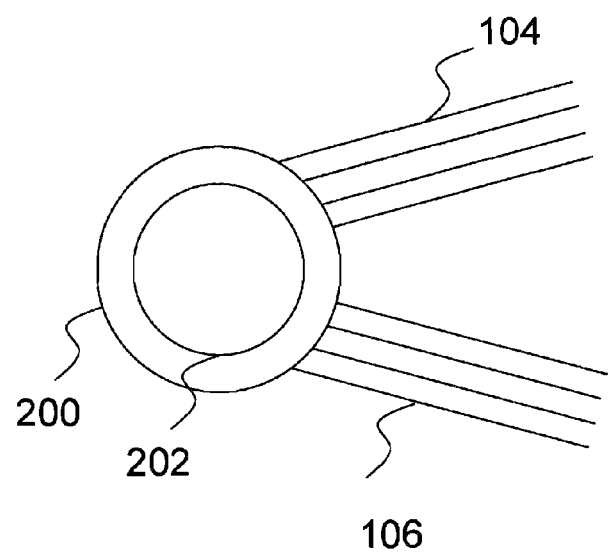
FIG. 2 is a schematic view illustrating a configuration of an optical temperature sensor of an embodiment.

As shown in FIG. 2, the temperature sensitive body 102 includes an outer shell member 200, which is composed of a hollow particle in the form of an approximately spherical shape, and an inclusion 202 encapsulated in the outer shell member 200. The outer shell member 200 has a light transmissive characteristic. Therefore, a light emitted from the outside of the outer shell member 200 transmits through the outer shell member 200 and reaches the inclusion 202. On the other hand, a light emitted from a surface of the inclusion 202 transmits through the outer shell member 200 and emits to the outside of the outer shell member 200.

The inclusion 202 is enclosed in the outer shell member 200. The inclusion 202 varies in an optical property related to a light irradiated thereon in accordance with a change in temperature. As the inclusion 202, a temperature sensitive fluorescent agent may be employed. In this case, the inclusion 202 emits a fluorescence depending upon a temperature of the inclusion 202 itself when a light is radiated thereon.

Here, the inclusion 202 may be a transmissive substance having a transmittance that varies in accordance with a change in temperature, or may be a light transmissive substance having an absorption spectrum that varies in accordance with a change in temperature. In these cases, when a light is radiated on the inclusion 202, the irradiated light is refracted according to a refractive index determined depending upon a temperature of the inclusion 202, and then incident into the inside of the inclusion 202. The light incident into the inside of the inclusion 202 is scattered depending upon the temperature of the inclusion 202 while traveling on the inside of the inclusion 202, and finally is emitted from the inclusion 202. The fluorescence, reflected light, transmitted light, or scattered light (hereinafter, inclusively referred to as a "response light") emitted from the inclusion 202 reflects the temperature of the inclusion 202.

For the inclusion 202, it is preferable to select a substance whose optical property is highly dependent upon temperature. However, such a substance is not always robust to heat and external force. It is also possible to employ a substance such as carbon dioxide or water, which is in a gas or liquid phase at room temperature and pressure, as the inclusion 202. However, it is difficult to maintain the position and size of such a substance constant. Therefore, in order to ensure the geometric stability of the temperature sensitive body 102 with respect to heat and external force, a substance to be used for the outer shell member 200 is required to maintain in a solid phase within an expected temperature range of a material to be measured, have a thermal expansion coefficient less than that of the inclusion 202, have a bulk modulus of elasticity higher than that of the inclusion 202, and have a phase transition temperature from a solid phase to a liquid phase higher than that of the inclusion 202. By employing such a substance, the outer shell member 200 and the inclusion 202 are stabilized in shape within the expected temperature range, and the deformation of the inclusion 202 is suppressed as well.

It is preferable that the outer shell member 200 is made small in radius as long as it does not hamper the measurement. As the radius of the outer shell member 200 decreases, the heat capacity of the temperature sensitive body 102 decreases, and accordingly, responsiveness to change in temperature improves. Furthermore, as the radius of the outer shell member 200 decreases, the shape stability thereof with respect to external force increases. In a case in which the inclusion 202 is fluid within an expected temperature range, as the radius of the outer shell member 200 decreases, convective flow within the inclusion 202 is more suppressed.

It is preferable that the outer shell member 200 is transmissive to infrared light. If the outer shell member 200 has a transmissive characteristic to infrared light, it is possible to reduce deformation of the outer shell member 200 caused by radiation heat. Furthermore, since the transmissivity of radiation heat to the inclusion 202 increases, the responsiveness of the temperature sensitive body 102 to the radiation heat increases.

In a case in which a response light highly sensitive to changes in temperature transmits through the inclusion 202, a substance having an absolute refractive index lower than that of the inclusion 202 may be employed as the outer shell member 200. In this manner, it becomes possible to cause the irradiated light to be retroreflected from the inclusion 202. This means that a direction in which the irradiated light is radiated can be made to coincide with a direction in which the response light is received. In a case, in which retroreflection is performed, it is possible to increase the optical path of the light that transmits through the inclusion 202.

Meanwhile, for the production of the temperature sensitive body 102, a difference in phase transition temperature may be utilized, for example. If the outer shell member 200 is higher in phase transition temperature than the inclusion 202, a mixture of raw materials (liquid) of the outer shell member 200 and inclusion 202 are prepared at high temperature, and then, cooled down in such a manner that the mixture is maintained for a predetermined time within a temperature zone in the vicinity of the phase transition temperature of the raw material of the outer shell member 200. In this way, a temperature sensitive body 102 having the inclusion 202 enclosed in the outer shell member 200 can be acquired.

The first optical fiber 104 is connected to the inclusion 202 at a position where a light emitted from a core thereof irradiates the inclusion 202. The second optical fiber 106 is connected to the inclusion 202 so that a response light from the inclusion 202 is incident on a core of the second optical fiber 106. In FIG. 2, the first optical fiber 104 and second optical fiber 106 are directly connected to the outer shell member 200. This means that there is no substance intervening between the temperature sensitive body 102 and the first and second optical fibers 104, 106, thereby making it possible to eliminate a measuring error due to a change in temperature caused by any intervening substance therebetween. If the temperature sensitive body 102 is of a type that retroreflects an irradiated light, as shown in FIG. 2, the first optical fiber 104 and second optical fiber 106 are connected in a manner such that a direction of a light incident from the first optical fiber 104 is symmetrical to a direction of a response light incident to the second optical fiber 106 with respect to a center of the inclusion 202 in the form of a spherical shape.

The light source 120 radiates a light toward an entrance of the first optical fiber 104. The light source 120 is selected from among various light source devices generally used for optical temperature measurement so that a good response light can be acquired from the optical temperature sensor 110. The light source 120 is selected as appropriate in accordance with the inclusion 202 and measurement method. The light source 120 may be, for example, a pulsed laser device, a light emitting diode, a light bulb, or a lamp.

The optical measurement device 130 constitutes, along with the computing device 140, an optical analyzing device that receives an outgoing light from the temperature sensitive body 102, analyzes the outgoing light, and thereby detects a temperature of the inclusion 202. The optical measurement device 130 is selected from among various optical measurement devices generally used for optical temperature measurement so as to enable a good measurement of a response light from the optical temperature sensor 110. The optical measurement device 130 is selected as appropriate in accordance with the inclusion 202 and measurement method. For example, a photometer may be employed as the optical measurement device 130 in a case in which an intensity of the response light correlates with temperature. Also, for example, a spectrophotometer may be employed as the optical measurement device 130 in a case in which a spectrum of the response light correlates with temperature.

The computing device 140 is implemented with a computer hardware for general use, programs running on the hardware, and data. Since operations and functions of the computer are well known, a description thereof is omitted here.

The computing device 140 includes two functional modules. More particularly, the computing device 140 includes a first functional module that converts a measurement result (e.g., light intensity) of a response light outputted from the optical measurement device 130 into a temperature based on relational equations stored in advance with regard to relationship between an optical property of the inclusion 202 and temperatures, and a second functional module that calculates a heat flux of the inclusion 202 based on an amount of change in temperature acquired by a temperature calculation function. The first functional module detects a temperature of the inclusion 202, i.e., a temperature at a position where the temperature sensitive body 102 is placed. The second functional module calculates a heat flux q (W/m$^2$) in a region in which the temperature sensitive body 102 is placed using a volume V (m$^3$) of the temperature sensitive body 102, a heat transmission area S (m$^2$), a specific heat Cv(T) (J/m$^3$K), and an amount of change in temperature per unit time delta T (K/sec) acquired as a result of measurement by the first functional module.

The calculation method in the first functional module is selected as appropriate in accordance with the inclusion 202 and measurement method from among various conversion methods generally used for optical temperature measurement. The calculation in the first functional module may be a numerical calculation by a program or may be a conversion using a conversion table provided in advance.

Equation 1 is employed for calculation of a heat flux q (W/m$^2$) in the second functional module. Also, an equation in which thermal correction terms of the first and second optical fibers 104 and 106 are added to Equation 1 may be employed.

$$q = Cv(T) \cdot V \cdot \text{delta } T/S \qquad (1)$$

<Effect of the Embodiment>

In the present embodiment, a temperature measurement is performed that utilizes a substance whose optical property related to a light irradiated thereon varies depending upon temperature. Therefore, a response lag such as a case of a thermocouple is eliminated, and it is possible to realize highly responsive temperature measurement. Furthermore, since an outer shell member 200 is a hollow particle in the form of an approximately spherical shape, the outer shell member 200 and an inclusion 202 enclosed therein are resistant to deformation. Therefore, a change in light path length is suppressed when a light transmits through the inclusion 202. Thus, it is possible to enhance the accuracy of the temperature measurement. Furthermore, since the outer shell member 200 has a light transmissive characteristic, it is easy to irradiate the inclusion 202 and to measure a light irradiated upon the inclusion 202. Furthermore, since infrared radiation is transmitted to the inclusion 202, the temperature sensitive body 102 can be well related to a radiation heat. Furthermore, since there is no intervening substance between the temperature sensitive body 102 and the optical fibers 104 and 106, it is possible to avoid an error due to temperature change caused by any intervening substance therebetween.

<First Modification of Embodiments>

Figure 3:
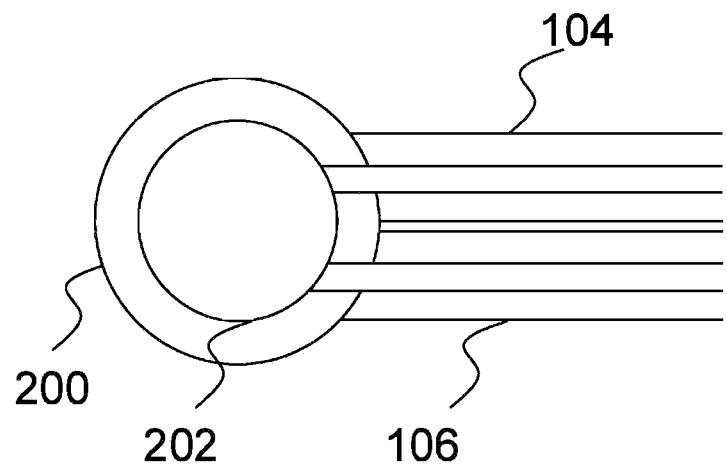
FIG. 3 is a schematic view illustrating a configuration of an optical temperature sensor of a first modification of the embodiment.

In a first modification, as shown in FIG. 3, clads of first and second optical fibers 104 and 106 and an outer shell member 200 are integrally formed with one another. The outer shell member 200 includes an incoming portion that allows an irradiated light directed to an inclusion 202 to be incident into the inside of the outer shell member 200, and an outgoing portion that allows a light returning from the inclusion 202 to emit from the outer shell member 200 toward the outside. The first optical fiber 104 is connected to the incoming portion. The second optical fiber 106 is connected to the outgoing portion. Cores of the first and second optical fibers 104 and 106 are held in abutment with a surface of the inclusion 202. The clads of the first and second optical fibers 104 and 106 and the outer shell member 200 are composed of the same material.

<Second Modification of Embodiments>

Figure 4:
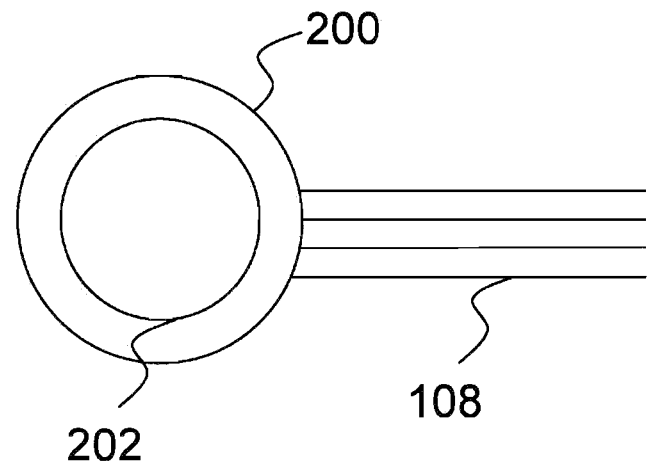
FIG. 4 is a schematic view illustrating a configuration of an optical temperature sensor of a second modification of the embodiment.

In a second modification, as shown in FIG. 4, a single optical fiber 108 serves as an incoming light guide path as well as an outgoing light guide path. A splitting optical system that splits incoming and outgoing lights is provided among a light source 120, the optical fiber 108, and an optical measurement device 130.

<Third Modification of Embodiments>

In a third modification, a plurality of optical fibers are provided for collecting response lights. In this case, from among a transmitted light, a reflected light, and a scattered light, one kind of light selected therefrom may be collected by the all of the optical fibers, or different kinds of light may be collected by respective corresponding optical fibers.

<Fourth Modification of Embodiments>

In a fourth modification, a light emitting status in a space, in which a temperature sensitive body 102 is provided (for example, a combustion chamber of an engine) is measured along with temperature and heat flux measurements. In this case, a light transmissive material is employed for an outer shell member 200. A light emitted outside the temperature sensitive body 102 is guided to a second optical fiber 106 via the outer shell member 200 and an inclusion 202, and an intensity of the emitted light is analyzed using a light coming out of the second optical fiber 106. Here, in order to prevent a spectrum of the light emitted outside and a spectrum of a response light from being overlapped with each other, it is necessary to appropriately select composition and optical properties of the inclusion 202.

INDUSTRIAL APPLICABILITY

As described above, the present invention is useful for a temperature sensitive body for measuring a temperature utilizing an optical property that varies with the temperature, an optical temperature sensor, a temperature measurement device, and a heat flux measurement device using the temperature sensitive body.

EXPLANATION OF REFERENCE NUMERALS

100 Temperature Measurement Device
102 Temperature Sensitive Body
104 First Optical Fiber (Incoming Light Guide Path)
106 Second Optical Fiber (Outgoing Light Guide Path)
110 Optical Temperature Sensor
120 Light Source
130 Optical Measurement Device (Optical Analyzing Device)
140 Computing Device (Optical Analyzing Device)
200 Outer Shell Member
202 Inclusion

The invention claimed is:

1. An optical temperature sensor, comprising:
an outer shell member formed of a light-transmissive substance;
an inclusion enclosed within the outer shell member, wherein the inclusion is made of a temperature sensitive fluorescent material and emits a fluorescence depending upon a temperature of the inclusion;
an incoming light guide path connected with the outer shell member; and
an outgoing light guide path connected with the outer shell member,
wherein
the outer shell member transmits a light entered from the incoming light guide path such that the light irradiates the inclusion,
the outer shell member transmits the light emitted from the inclusion such that the light enters the outgoing light guide path,
a thermal expansion coefficient of the outer shell member is less than a thermal expansion coefficient of the inclusion, and
a phase transition temperature from solid phase to liquid phase of the outer shell member is higher than a phase transition temperature from solid phase to liquid phase of the inclusion.

* * * * *